US008682636B2

(12) United States Patent  (10) Patent No.: US 8,682,636 B2
Bischof et al.  (45) Date of Patent: Mar. 25, 2014

(54) NON-CLIENT-SPECIFIC TESTING OF APPLICATIONS

(75) Inventors: Jorg Bischof, Muhlhausen (DE); Christian Cohrs, Sandhausen (DE); Christian Denkel, Karlsruhe (DE); Markus Dinkel, Walldorf (DE); Martin Kolb, Waghausel (DE)

(73) Assignee: SAP AG, Walldorf (DE)

( * ) Notice: Subject to any disclaimer, the term of this patent is extended or adjusted under 35 U.S.C. 154(b) by 2384 days.

(21) Appl. No.: 10/233,072

(22) Filed: Aug. 30, 2002

(65) Prior Publication Data

US 2004/0041827 A1   Mar. 4, 2004

(51) Int. Cl.
G06F 9/44 (2006.01)
G06F 9/445 (2006.01)
G06F 13/10 (2006.01)

(52) U.S. Cl.
USPC ............................................................ 703/21

(58) Field of Classification Search
USPC ........................................ 703/21; 707/104.1
See application file for complete search history.

(56) References Cited

U.S. PATENT DOCUMENTS

| | | | | |
|---|---|---|---|---|
| 5,157,384 A | * | 10/1992 | Greanias et al. | 345/156 |
| 5,335,342 A | | 8/1994 | Pope et al. | |
| 5,392,386 A | | 2/1995 | Chalas | |
| 5,404,528 A | | 4/1995 | Mahajan | |
| 5,412,772 A | | 5/1995 | Monson | |
| 5,418,941 A | | 5/1995 | Peters | |
| 5,442,791 A | | 8/1995 | Wrabetz et al. | |
| 5,557,740 A | | 9/1996 | Johnson et al. | |
| 5,657,438 A | | 8/1997 | Wygodny et al. | |
| 5,669,000 A | | 9/1997 | Jessen et al. | |
| 5,754,173 A | * | 5/1998 | Hiura et al. | 715/744 |
| 5,781,720 A | | 7/1998 | Parker et al. | |
| 6,099,317 A | * | 8/2000 | Bullwinkel et al. | 434/118 |
| 6,324,654 B1 | | 11/2001 | Wahl et al. | |
| 6,336,149 B1 | | 1/2002 | Preston | |
| 6,357,038 B1 | | 3/2002 | Scouten | |
| 6,421,634 B1 | * | 7/2002 | Dearth et al. | 703/14 |
| 6,434,629 B1 | | 8/2002 | Stearns et al. | |
| 6,615,303 B1 | * | 9/2003 | Endo et al. | 710/260 |
| 6,772,107 B1 | | 8/2004 | La Cascia et al. | |
| 6,775,821 B2 | | 8/2004 | Scouten | |
| 7,099,893 B2 | | 8/2006 | Bischof et al. | |

OTHER PUBLICATIONS

Cabri et al. "XML Dataspaces for Mobile Agent Coordination", ACM Press, 2000, pp. 181-188.*
Neifer, Markus "Looking through wxWindows", http://www-128.ibm.com/developerworks/library/l-wxwin.html, 9pgs.*
Neifer, Markus "Looking through wxWindows", Feb. 1, 2001, http://www-128.ibm.com/developerworks/library/l-wxwin.html, 9pgs.*

* cited by examiner

*Primary Examiner* — Suzanne Lo
(74) *Attorney, Agent, or Firm* — Fountainhead Law Group PC

(57) ABSTRACT

Computer-implemented methods, systems, computer programs and data files implement and use techniques for recording and recreating user interactions with an application program. User actions performed in interacting with an application program in a first user interface environment are detected, and an abstract representation of the user actions is recorded. The user actions access one or more components of the first user interface environment, which implement user interface elements of the application program. The abstract representation describes the user actions in a format independent of the components of the first user interface environment. The abstract representation is usable in a second user interface environment to recreate results of the user actions in the application program. The abstract representations can be used to test application programs in different user interface environments.

52 Claims, 6 Drawing Sheets

NON-CLIENT-SPECIFIC TESTING OF APPLICATIONS

BACKGROUND

The present invention relates to electronic data processing, and in particular to recording user interactions with a computer program application.

Recording a user's interaction with an application can be useful, for example, to test a system. In one approach to testing, known inputs (test data) are supplied to the application during execution to establish what outputs should result from specified user actions under proper operating conditions. Another instance of the application, which can be running on a different platform and at any location, can be tested by applying the test data to the other application instance and comparing the processed outputs to the predicted outputs. Using test data as input, the interaction with an application can be recorded and reviewed to learn about the system's behavior in response to the test input. Typically, a test tool is used to record the interactions of a user with an application. User interactions can be recorded by tracking messages generated by and for an operating system, such as a Microsoft® Windows® operating system. Low level messages such as key down, character N, key up, and so on can be grouped as a single higher-level input, such as the input by the user of the character "N", rather than actually storing all of the low level messages.

SUMMARY OF THE INVENTION

The present invention provides methods and apparatus, including computer program products, for non-client-specific testing of application programs.

In general, in one aspect, the invention provides computer-implemented methods and apparatus, including computer program apparatus, implementing and using techniques for recording user interactions with an application program. The techniques include detecting user actions performed in interacting with an application program in a first user interface environment and recording an abstract representation of the user actions. The user actions access one or more components of the first user interface environment, which implement user interface elements of the application program. The abstract representation of the user actions describes the user actions in a format independent of the components of the first user interface environment. The abstract representation is usable in a second user interface environment to recreate results of the user actions in the application program.

In general, in another aspect, the invention provides systems for recording a sequence of user actions. The system includes an application program executing in a first user interface environment, a scripting engine operable to detect a user action performed in interacting with the application program in the first user interface environment, and a recorder configured to record the abstract representation. The first user interface environment includes one or more components implementing user interface elements of the application program. The scripting engine is operable to generate an abstract representation of the user action. The abstract representation describes the user actions in a format independent of the components of the first user interface environment. The abstract representation is usable in a second user interface environment to recreate results of the user actions in the application program.

Particular implementations can include one or more of the following features. The abstract representation can be used in the second user interface environment to recreate results of the user actions in the application program. Using the abstract representation can include generating one or more commands that, when executed in the second user interface environment, cause the application program to recreate results of the user actions. Using the abstract representation can include using the commands to access one or more components of the second user interface environment. The abstract representation can include information representing the one or more user interface elements and one or more calls to methods of the user interface elements, the method calls corresponding to the user actions. The abstract representation can be modified in response to user input specifying one or more modified parameter values for one or more of the method calls corresponding to the user actions. Using the abstract representation can include calling one or more methods of user interface elements of the application program with the modified parameter values.

Detecting user actions can include receiving user input specifying one or more changes to elements of a user interface of the application program. Recording the abstract representation can include identifying, in response to the user input specifying changes, one or more user interface elements having a changed state and recording, for each of the identified user interface elements, information representing the changed state. Receipt of the user input specifying one or more changes can trigger a transmission from a client hosting the application program in the first user interface environment to a server, and the abstract representation can be recorded before the transmission from the client to the server. Detecting user actions can include receiving a stream of user input actions specifying changes to elements of a user interface of the application program. Recording the abstract representation can include recording information representing each action in the stream of user input actions. The abstract representation can be used to generate one or more commands that, when executed in the first user interface environment, cause the application program to recreate results of the user actions. The commands can be executed in the first user interface environment to recreate results of the user actions in the application program.

The abstract representation can be recorded in a format that is not proprietary to the first or second user interface environments. The format can be an XML format. The XML format can be defined by a schema including information describing a plurality of environments for the application program, a set of user interface elements provided by the application program in each of the plurality of environments, and, for each user interface element in the set of user interface elements, a set of one or more properties and/or methods that can be called in response to user actions performed on the corresponding user interface element. Using the abstract representation can include generating, in a format proprietary to the second user interface environment, one or more commands that, when executed in the second user interface environment, cause the application program to recreate results of the user actions.

The first and second user interface environments can be selected from user interface environments that provide distinct component frameworks into which user interface components operate. The abstract representation can be stored.

In general, in a third aspect, the invention provides computer-implemented methods and apparatus, including computer program apparatus, implementing and using techniques for recreating user interactions with an application program. The techniques include receiving an abstract representation of user actions performed in interacting with an application program in a first user interface environment and using the abstract representation in the second user interface environment to recreate results of the user actions in the application program. The user actions access one or more components of the first user interface environment, which implement user interface elements of the application program. The abstract representation describes the user actions in a format independent of the components of the first user interface environment.

Particular implementations can include one or more of the following. The user actions performed in interacting with the application program can define one or more calls to methods of the one or more user interface elements of the application program. The abstract representation can include information representing the one or more user interface elements and the one or more method calls. Using the abstract representation can include generating one or more commands that, when executed in the second user interface environment, cause the application program to recreate results of the user actions. The user actions performed in interacting with the application program in the first user interface environment can define one or more calls to methods of user interface elements of the first instance of the application program. The commands can define one or more calls to methods of user interface elements of the application program in the second user interface environment. The abstract representation can be modified in response to user input specifying one or more modified parameter values for one or more of the method calls defined by the user actions. Using the abstract representation in the second user interface environment can include calling one or more methods of user interface elements of the application program with the modified parameter values.

The abstract representation can be recorded in a format that is not proprietary to the first or second user interface environments. The format can be an XML format defined by a schema including information describing a plurality of environments for the application program, a set of user interface elements provided by the application program in each of the plurality of environments, and, for each user interface element in the set of user interface elements, a set of one or more properties and/or methods that can be called in response to user actions performed on the corresponding user interface element.

In general, in a fourth aspect, the invention provides data files stored on a computer-readable medium for describing user actions in an application program. The data files include an abstract representation of user actions performed in interacting with an application program in a first user interface environment. The user actions access one or more components of the first user interface environment, which implement user interface elements of the application program. The abstract representation describes the user actions in a format independent of the components of the first user interface environment. The abstract representation is usable in a second user interface environment to recreate results of the user actions in the application program.

Particular implementations can include one or more of the following. The user actions can define one or more calls to methods of one or more user interface elements in the first instance of the application program. The abstract representation can include information representing the one or more user interface elements and the one or more method calls. The abstract representation can include information representing a state of each of one or more user interface elements of the application program. The abstract representation can include information representing actions in a stream of user input actions specifying changes to elements of a user interface of the application program. The abstract representation can be recorded in a format that is not proprietary to the first or second user interface environments. The format can be an XML format. The XML format can be defined by a schema including information describing a plurality of environments for the application program, a set of user interface elements provided by the application program in each of the plurality of environments, and, for each user interface element in the set of user interface elements, a set of one or more properties and/or methods that can be called in response to user actions performed on the corresponding user interface element.

The invention can be implemented to realize one or more of the following advantages. User actions recorded (or generated) in a generic abstract format can be replayed in multiple different environments, regardless of the environment in which the user actions were recorded (or generated). Test scripts that are not specific to a given user interface platform can be used to test the functionality of application programs across multiple platforms. Recording user actions in an abstract, intermediate format allows for the generation of test scripts in a particular format for a particular user interface environment, or for the interpretation of the abstract representation and generation of generic user interface commands compatible with multiple, different platforms. A testing program interpreting the abstract representation can implement user actions differently for different platforms. The representation of user actions in an abstract, intermediate format allows for the validation of typed parameters.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
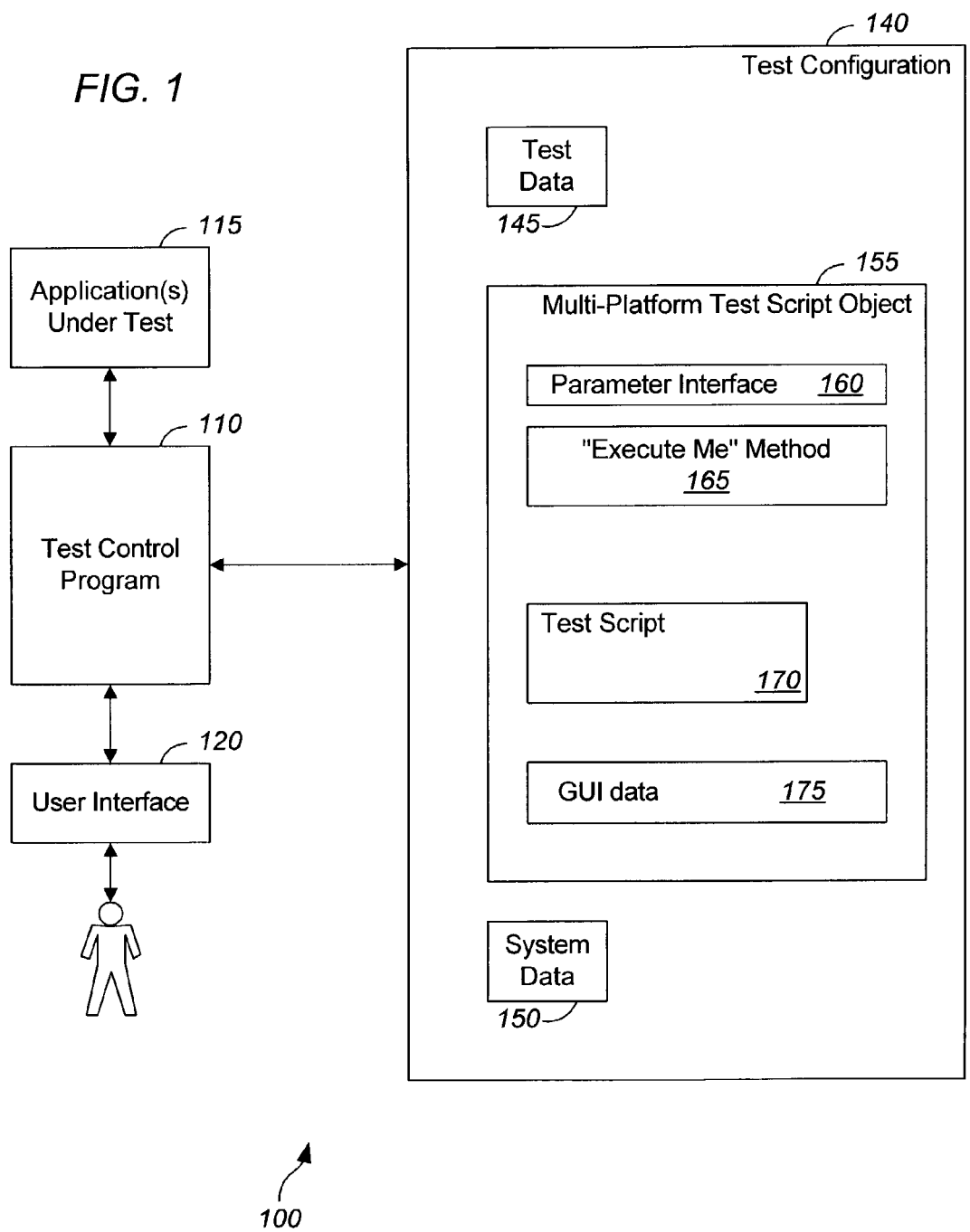
FIG. 1 is a block diagram illustrating an implementation and use of a test system for generating and using non-client specific user interface scripts.

FIG. 1 illustrates one implementation of a test system 100 in accordance with one aspect of the invention. A test control program 110 can be used to test one or more application programs 115. The applications being tested can be installed on one or more computers, generally distinct from the computer on which the test control program 110 is running. The test control program can be run by a user interacting with the program through a user interface 120.

To test particular functionality of an application program, a test configuration 140 is created, generally by a test developer using a test development workbench. The test configuration can encapsulate data and scripts to test one or more particular program functions in one or more user interface environments. The test configuration can include test data 145, system data 150, and a multi-platform (e.g., non-client specific) test script object 155. The test data 145 and system data 150 are generic—that is, they are not specific for any particular functionality—and so it will generally be more convenient to implement test configuration 140 as a persistent object containing a link to this data, rather than the data itself. The script object 155, on the other hand, is specific for one or more particular program functions. It is advantageous from the point of view of reuse for the script object 155 to be specific for one particular function. Nevertheless, it is convenient to implement test data 145, system data 150, and script object 155 as respective persistent objects that can be reused as appropriate.

The script object 155 has a parameter interface 160 and one or more versions of a test script. The parameter interface 160 defines the parameters that can be imported to, and exported from, the test script. The script object 155 has a public method 165 that is called to execute a test script 170. The script object 155 also has GUI data 175 to identify an appropriate user interface environment in which any particular instance of the application program being tested is executing. This can be provided in a table or other data structure, or the information can be associated with each test script as an attribute that identifies the user interface environments for which the test script can be used. This information will be updated as new test script, application and user interface versions are created. The parameter interface 160 is the same for all test script versions. A test script will in general also have variables and other script language constructs that are not global to all test script versions.

The test control program 110 can obtain meta-data describing the application program to be tested as it is installed on one or more particular computers, to determine version and other information about the application or applications and their particular installation. The meta-data will generally be provided by application build and installation processes and be stored in mass file storage local to the computer on which each application is installed. However, this information can also be stored in some central repository.

With these resources, a user can create a test plan made up of one or more test configurations 140, each having a script object 155 to test particular functionality of an application program as it is installed on one of more particular computers. It is advantageous that the user can do so without having to specify what the version is of each application to be tested, what the version is of its user interface, or what version of the test script should be used. When a particular script object 155 is executed, it will use the proper test script version according to the actual installed application version or versions.

Figure 2:
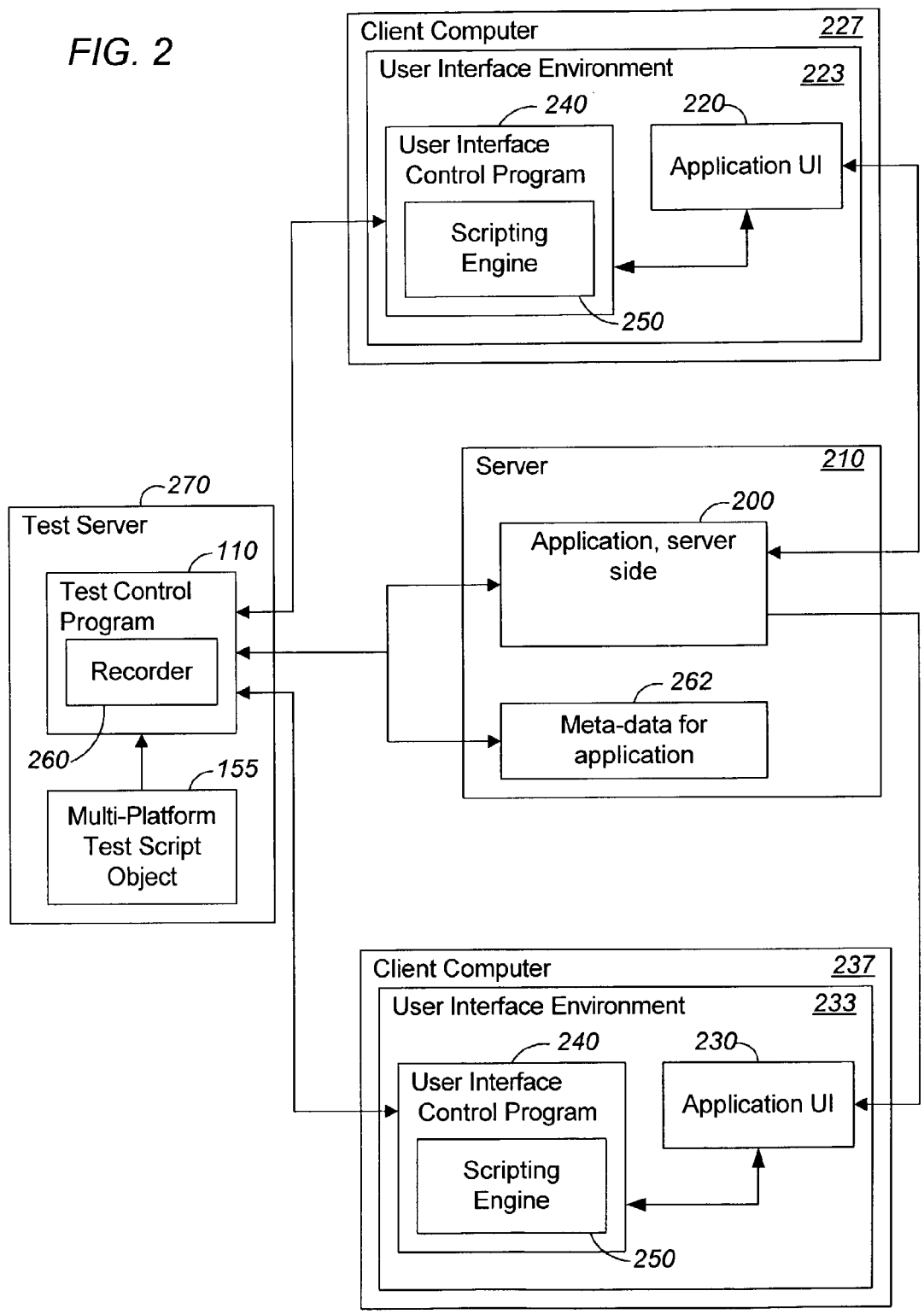
FIG. 2 is a block diagram illustrating a particular implementation of a test system for an application program featuring user interfaces running in two different user interface environments.

FIG. 2 shows a specific example of an application program 200 to be tested. The functionality of application program 200 can be invoked through a user interface, of which a first user interface 220, in a first user interface environment 223, and a second user interface 230, in a second user interface environment 233, are shown. While this example shows the application program and the first and second user interfaces and user interface environments as running on separate computers (server 210 and client computers 227, 237), some or all of these can reside on a single computer.

The user interface 220, 230 can be, for example, one or more HTML (Hypertext Markup Language) pages generated by application program 200 and displayed by a Web browser running on client computers 227, 237. The user interface environment represents the underlying implementation of the user interface, such as a Microsoft® Windows environment implemented on a client computer running under a Windows operating system (called a "Windows GUI environment" herein), or a Java™ environment running under a Windows, Linux or other operating system (called a "Java GUI environment" herein). A Java environment normally uses JavaBeans™ technology, which provides a component framework that allows components (called beans) to communicate with the framework and each other. Similarly, a Windows environment normally uses ActiveX™ controls, which are components that plug into a Microsoft ActiveX framework. The user interfaces present the functionality of application program 200 to the user as a collection of user interface elements, such as icons, text fields, menus, radio buttons, and the like. These user interface elements of application program 200 are implemented as components of user interface environments 223, 233, which can be component objects such as ActiveX or Java Beans components, or other computer program constructs as appropriate to the corresponding user interface environment, implementing visible elements of the corresponding user interface and their behavior. Typically, the functionality of the individual user interface elements is, or can be modified to be, accessible through a programming interface (e.g., a VBScript®, Java, or JavaScript® scripting interface) that is proprietary to the user interface environment. That is, the functionality provided by the user interface elements of user interfaces 220, 230, can be accessed programmatically (as opposed to interactively by a user manipulating elements in the user interface) through procedure calls in a user-interface-environment-specific scripting language such as VBScript or JavaScript.

The test control program 110 interacts with a user interface of application program 200 through a user interface control program 240 to test an application and user interface combination. In normal operation, when a user interacts with application program 200 by performing an action in user interface 220, such as by activating an icon or other user interface element displayed on an HTML page included in the user interface 220, a request is sent from the user interface 220 through user interface control program 240 to the server 210. Depending on the particular user interaction, this request can include calls to one or more methods of application program 200 in response to the user interaction.

User interface control program 240 includes a scripting engine 250 that is configured to detect user actions performed in interacting with the application program 200 through user interface 220, 230, and to generate user interface scripts representing these detected user actions. The scripting engine 250 can detect user actions by receiving requests from the user interface before they are sent to server 210. In some implementations, scripting engine 250 is configured to retrieve requests as they are transmitted from user interface 220, 230 to server 210, such as by monitoring a message queue. Alternatively, user interface 220, 230 can be configured to transmit requests to scripting engine 250—for example, by calling scripting engine 250 before or concurrent with a call to server 210—and passing the request to scripting engine 250. Scripting engine 250 can also be configured to replay previously generated user interface scripts, for example by parsing the user interface script and making calls to the user interface elements of application program 200 though user interface 220, 230 to recreate the results of the previously detected user actions or analogous programmed test actions, as will be described in more detail below.

In other implementations, the scripting engine 250 can be an application included with a user interface, or can be loaded from a server into the user interface. Alternatively, the scripting engine 250 can come packaged with the application program 200. In another alternative, the scripting engine 250 can be installed on the client computer 227, 237. Scripting engine 250 transmits the generated user interface scripts to a recorder 260, which stores the user interface scripts for later use, e.g., on test server 270.

Figure 3:
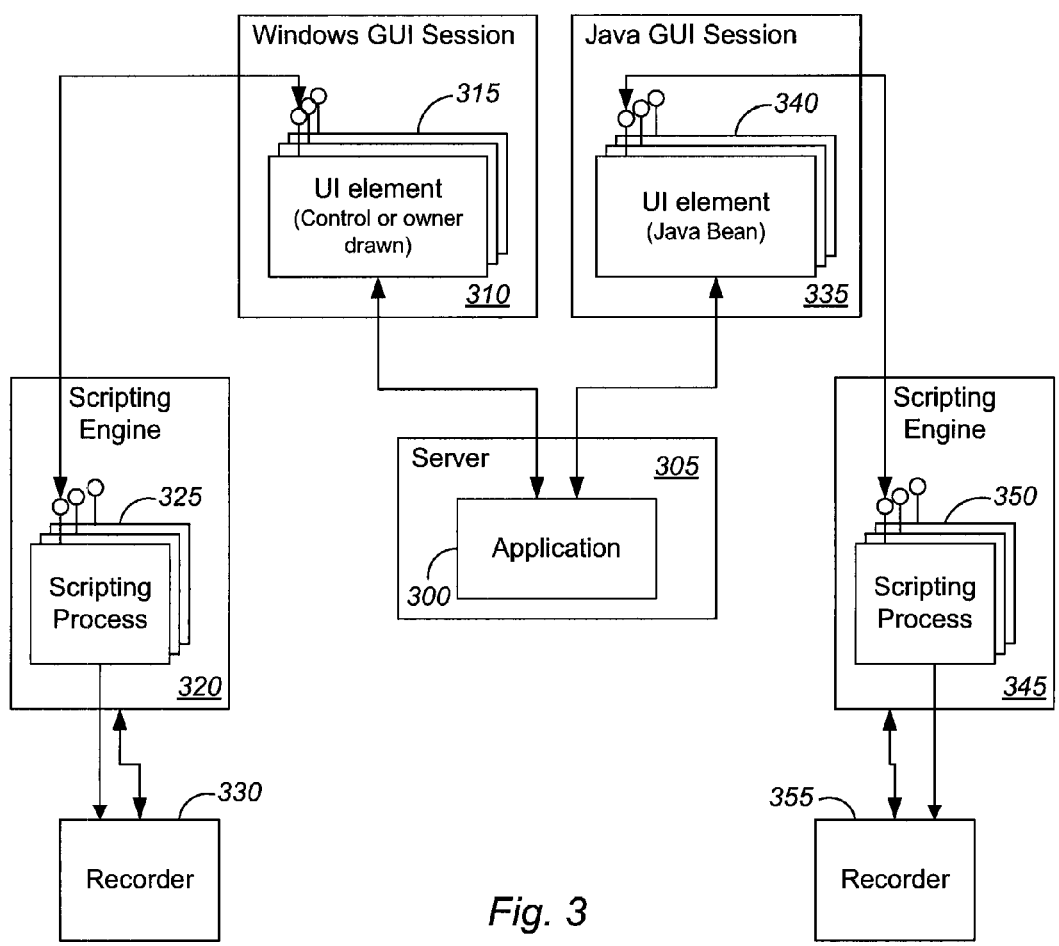
FIG. 3 is a block diagram illustrating one implementation of a script engine for generating and replaying user interface scripts.

FIG. 3 illustrates one implementation of a scripting engine in more detail. As shown, application program 300, executing on server 305, is in communication with two different user interface sessions, a Windows GUI session 310 and a Java GUI session 335, operating in a Windows GUI environment and a Java GUI environment, respectively. A user interacting with application program 300 through user interface sessions 310 or 335 accesses the functionality of application program 300 through user interface elements of application program 300 by performing actions on components 315, 340 in the corresponding user interface session. As discussed above, the user interface components are computer program constructs, such as ActiveX controls, Java Beans, or owner drawn elements, that implement visible elements of the user interface and their corresponding behavior. A scripting engine 320, 345, communicates with each of the user interface environments as described above to detect user actions in the user interface and to generate and replay user interface scripts corresponding to the detected actions.

In one implementation, when a user interface session is launched a corresponding scripting engine is instantiated, which, in turn, instantiates one or more scripting processes 325, 350. Alternatively, a single scripting engine, which can be incorporated in application program 300 or a separate program executing on server 305, can be responsible for instantiating and managing scripting processes for all executing user interface sessions for application program 300 (or multiple, different application programs executing on server 305). The scripting engine assigns each scripting process 325, 350 to a component 315, 340 of the user interface environment. The scripting processes can be implemented in one or more separate wrapper objects; alternatively, the scripting processes can be implemented in a variety of other ways, such as in the application program (e.g., as a method of the user interface elements) or in the components of the user interface environment.

Each scripting process 325, 350 communicates with its assigned component 315, 340 of the corresponding user interface session. Users interact with application program 300 by manipulating user interface elements of application program 300 that are implemented as components 315, 340 of a user interface session 310, 335—for example, by entering text into text fields, activating buttons, marking check boxes, and so on. Each user action in the user interface environment changes the state of a corresponding component. These state changes are transmitted to application program 300—for example, as procedure calls to methods of the user interface element that corresponds to the component, passing parameters defining a new state for the user interface element based on the user actions. These state changes can be transmitted in real time, as they occur, resulting in transmission of every change (e.g., key down, mouse click, etc.) triggered by the user. Alternatively, state changes can be transmitted as a block, at predefined points in time or in response to predetermined events that effectively pass control from the clients hosting user interface sessions 310, 335 to application program 300 on server 305. In the latter case, the transmission can identify each interim state—i.e., each change triggered by the user—or it can identify a net change in the state of one or more user interface elements (e.g., every user interface element with which the user has interacted) over a period of time, such as since the immediately preceding transmission or transfer of control.

Scripting processes 325, 350 monitor the changes to their associated components (e.g., by intercepting transmissions from the user interface session 310, 335 to application program 300), and generate an abstract representation of any changes, which they (or scripting engine 320, 345) transmit to a recorder 330, 355, or, optionally, more than one recorder. In implementations in which components 315, 340 transmit each user action in the user interface to application program 300, scripting processes 325, 350 can generate an abstract representation that includes each such user action. Thus, for example, if a user enters the character "a" into a text field, presses backspace to delete that character, and enters "Hugo", the abstract representation generated by scripting processes 325, 350 can reflect the entry of the characters "a", <backspace>, "H", "u", "g", "o" into the relevant text field. Alternatively, scripting processes 325, 350 can be configured to generate an abstract representation that reflects only the net changes to user interface elements—for example, by representing only the net change when control passes from the user interface session to the server as discussed above. Thus, in the example just described, if control passes to the server after the user has finished entering "Hugo" into the text field (e.g., as a result of the user's activating an "OK" button in the user interface), the abstract representation can reflect only the net change in state of the text field—that is, the entry of the text string "Hugo", and not the user's initial entry of "a" or the subsequent deletion of that character.

Scripting processes 325, 350 can also be configured to receive a previously generated abstract representation and to make calls to their associated components of the user interface environment in order to recreate the user actions from which the abstract representation was generated. Each scripting process can include methods that enable it to call an associated component in a variety of different user interface environments; alternatively, scripting engines 320, 345 can be configured to instantiate user-interface-environment-specific scripting processes for a given situation based, e.g., on information provided by the user or in system data as illustrated in FIG. 1.

In one implementation, each user interface component 315, 340 has a collection of properties corresponding to the properties of the user interface element they implement, and a collection of methods, including a Get ChangedState method that retrieves the value of a ChangedState property that indicates whether the state of the corresponding component has been changed as a result of user actions, and identifies what component properties have been changed as a result of those actions. Each scripting process 325, 350 detects changes to its associated component by calling the Get ChangedState method of the component (e.g., in response to an instruction from their controlling scripting engine upon detecting that control is about to pass to server 305). If the component's state has changed, the relevant scripting process 325, 350 gets a current value for each changed property, tags that value to identify both the property and the user interface element that corresponds to the component, and transmits the tagged value to recorder 330, 355 for incorporation into the abstract representation.

The abstract representation includes information sufficient to identify any user interface element whose state has changed as a result of user actions performed in interacting with the application program and to reproduce those changes, such as information that identifies what user interface elements have been modified by the user (i.e., the user interface elements corresponding to the components upon which the user has acted), what properties of those elements have been changed and/or what methods of those elements have been called, and the new values of any changed properties and/or the parameters with which any method has been called. Optionally, the abstract representation can include more information, such as information sufficient to identify and reproduce any action that the user has performed, whether or not those actions resulted in a change in the state of any user interface element. The abstract representation can also include additional information reflecting the system conditions under which the abstract representation was generated, such as the name and version number of the application program and user interface environment in which the actions were performed, the system configuration, and the like.

The abstract representation is generated in an intermediate format, independent of the components of the user interface environment in which the user actions were and/or are to be performed, such that the abstract representation can be used by a test program (e.g., test control program 110 shown in FIG. 1) to recreate results of the user actions in a second user interface environment. Thus, an abstract representation generated from user actions performed in a first user interface environment, such as a Windows GUI environment, can be replayed in a second user interface environment, such as a Java GUI environment, even though the two environments do not share a common programming interface.

The abstract representation can be generated in any convenient form, such as a list, a table, or a text document. In one implementation, the abstract representation is generated as an XML document, according to a predefined XML schema describing the user interface elements of the application program and the methods and properties of those elements. The same schema that is used to generate the abstract representation can be used to run the test script in which the abstract representation is incorporated, whatever user interface environment that test script is being run in. Alternatively, other formats—in general, formats that are not proprietary to either the first or second user interface environments—are possible.

One example of an abstract representation generated as an XML document is illustrated in Listing 1, below.

Listing 1.

```
<?xml version="1.0" ?>
- <GuiScripting xmlns:xsi="http://www.w3.org/2000/10/
   XMLSchema-instance"
   xsi:noNamespaceSchemaLocation="SAPGUI.xsd">
   <ResetGUI />
   <ConnectionId readonly="false">/app/con[0]</ConnectionId>
   <SessionId readonly="false">ses[1]</SessionId>
- <SystemInfo>
       <SystemName readonly="true">BCE</SystemName>
       <Client readonly="true">000</Client>
       <Language readonly="true">DE</Language>
       <Codepage readonly="true">1160</Codepage>
       <MessageServer readonly="true">bcemain.wdf.sap-
           ag.de</MessageServer>
       <Group readonly="true">PUBLIC </Group>
   - <ScriptingEngine>
       <GUI readonly="true">WinGUI</GUI>
       <MajorVersion readonly="true">6200</MajorVersion>
       <MinorVersion readonly="true">43</MinorVersion>
   </ScriptingEngine>
</SystemInfo>
- <ProcessedScreen>
       <Active>X</Active>
```

Listing 1.

```
       <Transaction>SESSION_MANAGER</Transaction>
       <Program>SAPLSMTR_NAVIGATION</Program>
       <ScreenNumber>100</ScreenNumber>
   - <UserChangedState>
       - <GuiElement>
           <Name>okcd</Name>
           <Type>GuiOkCodeField </Type>
           <Id>wnd[0]/tbar[0]/okcd</Id>
       - <State>
           - <SetProperty>
               <Name>text</Name>
               <Value type="string">se38</Value>
           </SetProperty>
       </State>
       </GuiElement>
       - <GuiElement>
           <Name>wnd[0]</Name>
           <Type>GuiMainWindow</Type>
           <Id>wnd[0]<Id>
       - <State>
           - <Method>
               <Name>sendVKey</Name>
               <Parameter type="string">0</Parameter>
           </Method>
       </State>
       </GuiElement>
   </UserChangedState>
</ProcessedScreen>
- <ProcessedScreen>
       <Active>X</Active>
       <Transaction>SE38</Transaction>
       <Program>SAPLWBABAP</Program>
       <ScreenNumber>100</ScreenNumber>
   - <UserChangedState>
       - <GuiElement>
           <Name>RS38M-PROGRAMM</Name>
           <Type>GuiCTextField</Type>
           <Id>wnd[0]/usr/ctxtRS38M-PROGRAMM</Id>
       - <State>
           - <SetProperty>
               <Name>text</Name>
               <Value
                   type="string">saptextedit_demo_
                   3</Value>
           </SetProperty>
           - <Method>
               <Name>setFocus</Name>
           </Method>
           - <SetProperty>
               <Name>caretPosition</Name>
               <Value type="string">18</Value>
           </SetProperty>
       </State>
       </GuiElement>
       - <GuiElement>
           <Name>wnd[0]</Name>
           <Type>GuiMainWindow</Type>
           <Id>wnd[0]<Id>
       - <State>
           - <Method>
               <Name>sendVKey</Name>
               <Parameter type="string">8</Parameter>
           </Method>
       </State>
       </GuiElement>
   </UserChangedState>
</ProcessedScreen>
- <Processed Screen>
       <Active>X</Active>
       <Transaction>SE38</Transaction>
       <Program>SAPTEXTEDIT_DEMO_3</Program>
       <ScreenNumber>100</ScreenNumber>
   - <UserChangedState>
       - <GuiElement>
           <Name>okcd</Name>
           <Type>GuiOkCodeField</Type>
           <Id>wnd[0]/tbar[0]/okcd</Id>
       - <State>
```

Listing 1.

```
- <SetProperty>
        <Name>text</Name>
        <Value type="string">/n</Value>
        </SetProperty>
    </State>
 </GuiElement>
- <GuiElement>
      <Name>wnd[0]</Name>
      <Type>GuiMainWindow</Type>
      <Id>wnd[0]</Id>
   - <State>
      - <Method>
            <Name>sendVKey</Name>
            <Parameter type="string">0</Parameter>
        </Method>
     </State>
 </GuiElement>
</UserChangedState>
</Processed Screen>
</GuiScripting>
```

In this XML abstract representation, user actions are represented in screens ("ProcessedScreen" elements), with changed user interface elements being grouped in transactions. Thus, for example, during a Session_Manager transaction the user changed the state of two user interface elements—first, in a "GuiOkCodeField" type element with the name "okcd" and ID "wnd[0]/tbar[0]/okcd", a "text" property was set to the string value "se38", while in a "GuiMainWindow" type element with the name and ID "wnd[0]", a "sendVKey" method was called with the string parameter "0". A VBScript script executing the same actions as described by the XML document set out above is shown in Listing 2, below.

Listing 2.

```
Set SapGuiAuto = GetObject("SAPGUI")
Set Engine = SapGuiAuto.GetScriptingEngine
Set Session = Engine.Children(0).Children(0)
Session.FindById("wnd[0]/usr").resize "126","30","False"
Session.FindById("wnd[0]/tbar[0]/okcd").text = "/nse38"
Session.FindById("wnd[0]").sendVKey "0"
Session.FindById("wnd[0]/usr/ctxtRS38M-PROGRAMM").text = "SAPTEXTEDIT_DEMO_3"
Session.FindById("wnd[0]/usr/ctxtRS38M-PROGRAMM").setFocus
Session.FindById("wnd[0]/usr/ctxtRS38M-PROGRAMM").caretPosition = "18"
Session.FindById("wnd[0]").sendVKey "8"
Session.FindById("wnd[0]/tbar[0]/okcd").text = "/n"
Session.FindById("wnd[0]").sendVKey "0"
```

While the VBScript representation of these actions is obviously more compact than the XML abstract representation, it can only be implemented in a Windows GUI environment. Moreover, the XML abstract representation includes additional information that is not captured in the VBScript script, such as the system name, client, language, codepage, messageserver, and group identifiers, and GUI and version information for the scripting engine. The XML schema on which the XML representation of Listing 1 is based is set out in Listing 3, below.

Listing 3.

```
<?xml version="1.0"?>
<xsd:schema xmlns:xsd="http://www.w3.org/2001/XMLSchema"
elementFormDefault="qualified">
    <!-- global definitions for checks -->
    <xsd:simpleType name="AbapBoolType">
        <xsd:restriction base="xsd:string">
            <xsd:enumeration value=" "/>
            <xsd:enumeration value="X"/>
        </xsd:restriction>
    </xsd:simpleType>
    <xsd:element name="Check" type="AbapBoolType">
        <xsd:annotation>
            <xsd:documentation>Tag determining whether content of
that screen should be considered on replaying</xsd:documentation>
        </xsd:annotation>
    </xsd:element>
    <xsd:element name="ResetGUI" type="AbapBoolType">
        <xsd:annotation>
            <xsd:documentation>Tag determining whether a SAPGUI
command should trigger an ok-code "/n" for initializing the
modus</xsd:documentation>
        </xsd:annotation>
    </xsd:element>
    <!-- /global definitions for checks -->
    <!-- global definitions contained within GUIScripting -->
    <xsd:complexType name="StringReadonlyRequiredType">
        <xsd:simpleContent>
            <xsd:extension base="xsd:string">
                <xsd:attribute name="readonly" type="xsd:boolean"
use="required" default="true"/>
            </xsd:extension>
        </xsd:simpleContent>
    </xsd:complexType>
    <xsd:element name="SystemName" type="StringReadonlyRequiredType">
        <xsd:annotation>
            <xsd:documentation>string</xsd:documentation>
        </xsd:annotation>
    </xsd:element>
    <xsd:element name="Client" type="StringReadonlyRequiredType">
```

-continued

Listing 3.

```
        <xsd:annotation>
            <xsd:documentation>string</xsd:documentation>
        </xsd:annotation>
    </xsd:element>
    <xsd:element name="Language" type="StringReadonlyRequiredType">
        <xsd:annotation>
            <xsd:documentation>string</xsd:documentation>
        </xsd:annotation>
    </xsd:element>
    <xsd:element name="Codepage" type="StringReadonlyRequiredType">
        <xsd:annotation>
            <xsd:documentation>string</xsd:documentation>
        </xsd:annotation>
    </xsd:element>
    <xsd:element name="RecordedBy" type="StringReadonlyRequiredType">
        <xsd:annotation>
            <xsd:documentation>Username</xsd:documentation>
        </xsd:annotation>
    </xsd:element>
    <xsd:element name="ConnectionId" type="StringReadonlyRequiredType">
        <xsd:annotation>
            <xsd:documentation>string</xsd:documentation>
        </xsd:annotation>
    </xsd:element>
    <xsd:element name="SessionId" type="StringReadonlyRequiredType">
        <xsd:annotation>
            <xsd:documentation>string</xsd:documentation>
        </xsd:annotation>
    </xsd:element>
    <xsd:element name="MessageServer" type="StringReadonlyRequiredType">
        <xsd:annotation>
            <xsd:documentation>string</xsd:documentation>
        </xsd:annotation>
    </xsd:element>
    <xsd:element name="Group" type="StringReadonlyRequiredType">
        <xsd:annotation>
            <xsd:documentation>string</xsd:documentation>
        </xsd:annotation>
    </xsd:element>
    <xsd:element name="ApplicationServer"
type="StringReadonlyRequiredType">
        <xsd:annotation>
            <xsd:documentation>string</xsd:documentation>
        </xsd:annotation>
    </xsd:element>
    <xsd:simpleType name="GUIType">
        <xsd:restriction base="xsd:string">
            <xsd:enumeration value="WinGUI"/>
            <xsd:enumeration value="JavaGUI"/>
        </xsd:restriction>
    </xsd:simpleType>
    <xsd:element name="MajorVersion" type="StringReadonlyRequiredType">
        <xsd:annotation>
            <xsd:documentation>Major Version of Scripting
Engine</xsd:documentation>
        </xsd:annotation>
    </xsd:element>
    <xsd:element name="MinorVersion" type="StringReadonlyRequiredType">
        <xsd:annotation>
            <xsd:documentation>Minor Version of Scripting
Engine</xsd:documentation>
        </xsd:annotation>
    </xsd:element>
    <xsd:element name="GUI">
        <xsd:annotation>
            <xsd:documentation>JavaGUI / WinGUI</xsd:documentation>
        </xsd:annotation>
        <xsd:complexType>
            <xsd:simpleContent>
                <xsd:extension base="GUIType">
                    <xsd:attribute name="readonly"
type="xsd:boolean" use="required" default="true"/>
                </xsd:extension>
            </xsd:simpleContent>
        </xsd:complexType>
    </xsd:element>
    <xsd:complexType name="ScriptingEngineType">
        <xsd:sequence>
```

-continued

Listing 3.

```
            <xsd:element ref="GUI"/>
            <xsd:element name="MajorVersion"/>
            <xsd:element name="MinorVersion"/>
        </xsd:sequence>
    </xsd:complexType>
    <!-- /global definitions contained within GUIScripting -->
    <!-- global definitions contained within Processed Screen -->
    <xsd:element name="Active" type="AbapBoolType">
        <xsd:annotation>
            <xsd:documentation>Tag determining whether content of
that screen should be considered on replaying</xsd:documentation>
        </xsd:annotation>
    </xsd:element>
    <xsd:element name="Transaction" type="xsd:string">
        <xsd:annotation>
            <xsd:documentation>string</xsd:documentation>
        </xsd:annotation>
    </xsd:element>
    <xsd:element name="Program" type="xsd:string">
        <xsd:annotation>
            <xsd:documentation>string</xsd:documentation>
        </xsd:annotation>
    </xsd:element>
    <xsd:element name="ScreenNumber" type="xsd:string">
        <xsd:annotation>
            <xsd:documentation>string</xsd:documentation>
        </xsd:annotation>
    </xsd:element>
    <!-- /global definitions contained within Processed Screen -->
    <!-- global definitions contained within GuiElement -->
    <xsd:element name="Name" type="xsd:string"/>
    <xsd:element name="Type" type="xsd:string">
        <xsd:annotation>
            <xsd:documentation>string, GuiElement
Type</xsd:documentation>
        </xsd:annotation>
    </xsd:element>
    <xsd:element name="SubType" type="xsd:string">
        <xsd:annotation>
            <xsd:documentation>string, GuiElement
SubType</xsd:documentation>
        </xsd:annotation>
    </xsd:element>
    <xsd:element name="Id" type="xsd:string">
        <xsd:annotation>
            <xsd:documentation>string</xsd:documentation>
        </xsd:annotation>
    </xsd:element>
    <xsd:complexType name="ParameterType">
        <xsd:simpleContent>
            <xsd:extension base="xsd:string">
                <xsd:attribute name="type" type="xsd:long"
use="required"/>
            </xsd:extension>
        </xsd:simpleContent>
    </xsd:complexType>
    <xsd:complexType name="ReturnType" mixed="true">
        <xsd:choice>
            <xsd:element name="GetProperty" type="GetPropertyType"/>
            <xsd:element name="SetProperty" type="SetPropertyType"/>
            <xsd:element name="Method" type="MethodType"/>
            <xsd:sequence minOccurs="0">
                <xsd:element ref="Check" minOccurs="0"/>
                <xsd:element name="CheckValue" type="xsd:string">
                    <xsd:annotation>
                        <xsd:documentation>On a return value a
check is possible if the parameter of value is specified to check
against</xsd:documentation>
                    </xsd:annotation>
                </xsd:element>
            </xsd:sequence>
        </xsd:choice>
        <xsd:attribute name="type" type="xsd:long" use="required"/>
    </xsd:complexType>
    <!-- /global definitions contained within GuiElement -->
    <xsd:complexType name="MethodType">
        <xsd:sequence>
            <xsd:element ref="Name"/>
```

Listing 3.

```
            <xsd:sequence minOccurs="0" maxOccurs="unbounded">
                <xsd:choice>
                    <xsd:element name="Parameter" type="ParameterType"/>
                    <xsd:element name="ArrayParameter">
                        <xsd:complexType>
                            <xsd:sequence maxOccurs="unbounded">
                                <xsd:element name="Value" type="ParameterType"/>
                            </xsd:sequence>
                        </xsd:complexType>
                    </xsd:element>
                </xsd:choice>
            </xsd:sequence>
            <xsd:sequence minOccurs="0">
                <xsd:choice>
                    <xsd:element name="ReturnValue" type="ReturnType"/>
                    <xsd:element name="ArrayReturnValue">
                        <xsd:complexType>
                            <xsd:sequence maxOccurs="unbounded">
                                <xsd:element name="Value" type="ReturnType"/>
                            </xsd:sequence>
                        </xsd:complexType>
                    </xsd:element>
                </xsd:choice>
            </xsd:sequence>
        </xsd:sequence>
    </xsd:complexType>
    <xsd:complexType name="SetPropertyType">
        <xsd:sequence>
            <xsd:element ref="Name"/>
            <xsd:choice>
                <xsd:sequence>
                    <xsd:element name="Value" type="ParameterType"/>
                </xsd:sequence>
                <xsd:element name="ArrayValue">
                    <xsd:complexType>
                        <xsd:sequence maxOccurs="unbounded">
                            <xsd:element name="Value" type="ParameterType"/>
                        </xsd:sequence>
                    </xsd:complexType>
                </xsd:element>
            </xsd:choice>
        </xsd:sequence>
    </xsd:complexType>
    <xsd:complexType name="GetPropertyType">
        <xsd:sequence>
            <xsd:element ref="Name"/>
            <xsd:choice>
                <xsd:element name="Value" type="ReturnType"/>
                <xsd:element name="ArrayValue">
                    <xsd:complexType>
                        <xsd:sequence maxOccurs="unbounded">
                            <xsd:element name="Value" type="ReturnType"/>
                        </xsd:sequence>
                    </xsd:complexType>
                </xsd:element>
            </xsd:choice>
        </xsd:sequence>
    </xsd:complexType>
    <xsd:complexType name="StateType">
        <xsd:annotation>
            <xsd:documentation>I==O==C=T=K==D==A==L==description=List of Methods and Properties</xsd:documentation>
        </xsd:annotation>
        <xsd:choice minOccurs="0" maxOccurs="unbounded">
            <xsd:element name="SetProperty" type="SetPropertyType" minOccurs="0"/>
            <xsd:element name="GetProperty" type="GetPropertyType" minOccurs="0"/>
            <xsd:element name="Method" type="MethodType"
```

-continued

Listing 3.

```
minOccurs="0"/>
        </xsd:choice>
    </xsd:complexType>
    <xsd:complexType name="GuiElementType">
        <xsd:sequence>
            <xsd:element ref="Check" minOccurs="0"/>
            <xsd:element ref="Name"/>
            <xsd:element ref="Type"/>
            <xsd:element ref="SubType" minOccurs="0"/>
            <xsd:element ref="Id"/>
            <xsd:element name="State" type="StateType"
minOccurs="0"/>
            <xsd:element name="GuiElement" type="GuiElementType"
minOccurs="0" maxOccurs="unbounded"/>
        </xsd:sequence>
    </xsd:complexType>
    <xsd:complexType name="GuiElementSimpleType">
        <xsd:sequence>
            <xsd:element ref="Name"/>
            <xsd:element ref="Type"/>
            <xsd:element ref="SubType" minOccurs="0"/>
            <xsd:element ref="Id"/>
            <xsd:element name="State" type="StateType"/>
        </xsd:sequence>
    </xsd:complexType>
    <xsd:element name="CallOn" type="xsd:string"/>
    <xsd:complexType name="CommandType">
        <xsd:sequence>
            <xsd:element ref="CallOn"/>
            <xsd:choice>
                <xsd:element name="SetProperty"
type="SetPropertyType" minOccurs="0"/>
                <xsd:element name="GetProperty"
type="GetPropertyType" minOccurs="0"/>
                <xsd:element name="Method" type="MethodType"
minOccurs="0"/>
            </xsd:choice>
        </xsd:sequence>
    </xsd:complexType>
    <xsd:complexType name="MessageType">
        <xsd:sequence>
            <xsd:element name="Type"
type="StringReadonlyRequiredType"/>
            <xsd:element name="Text"
type="StringReadonlyRequiredType"/>
            <xsd:element name="Id"
type="StringReadonlyRequiredType"/>
            <xsd:element name="Number"
type="StringReadonlyRequiredType"/>
            <xsd:element name="Parameter1"
type="StringReadonlyRequiredType"/>
            <xsd:element name="Parameter2"
type="StringReadonlyRequiredType"/>
            <xsd:element name="Parameter3"
type="StringReadonlyRequiredType"/>
            <xsd:element name="Parameter4"
type="StringReadonlyRequiredType"/>
            <xsd:element name="Parameter5"
type="StringReadonlyRequiredType" minOccurs="0"/>
            <xsd:element name="Parameter6"
type="StringReadonlyRequiredType" minOccurs="0"/>
            <xsd:element name="Parameter7"
type="StringReadonlyRequiredType" minOccurs="0"/>
            <xsd:element name="Parameter8"
type="StringReadonlyRequiredType" minOccurs="0"/>
            <xsd:element name="AsPopup"
type="StringReadonlyRequiredType"/>
        </xsd:sequence>
    </xsd:complexType>
    <xsd:complexType name="InitialStateType">
        <xsd:sequence>
            <xsd:element ref="Check"/>
            <xsd:element name="GuiElement" type="GuiElementType"
minOccurs="0" maxOccurs="unbounded"/>
        </xsd:sequence>
    </xsd:complexType>
    <xsd:complexType name="UserChangedStateType">
        <xsd:choice minOccurs="0" maxOccurs="unbounded">
```

Listing 3.

```
            <xsd:element name="Command" type="CommandType"/>
            <xsd:element name="GuiElement"
type="GuiElementSimpleType"/>
        </xsd:choice>
    </xsd:complexType>
    <xsd:complexType name="ProcessedScreenType">
        <xsd:sequence>
            <xsd:element ref="Active"/>
            <xsd:element ref="Transaction"/>
            <xsd:element ref="Program"/>
            <xsd:element ref="ScreenNumber"/>
            <xsd:element name="Message" type="MessageType"
minOccurs="0">
                <xsd:annotation>
                    <xsd:documentation>If available: Information
to a displayed message</xsd:documentation>
                </xsd:annotation>
            </xsd:element>
            <xsd:element name="InitialState" type="InitialStateType"
minOccurs="0">
                <xsd:annotation>
                    <xsd:documentation>Initial state with
hierarchical list of GuiElements corresponding to screen layout for
checks</xsd:documentation>
                </xsd:annotation>
            </xsd:element>
            <xsd:element name="UserChangedState"
type="UserChangedStateType" minOccurs="0">
                <xsd:annotation>
                    <xsd:documentation>Sequence list of commands
and calls for each GuiElement with user changed state</xsd:documentation>
                </xsd:annotation>
            </xsd:element>
        </xsd:sequence>
    </xsd:complexType>
    <xsd:complexType name="SystemInfoType">
        <xsd:sequence>
            <xsd:element ref="SystemName"/>
            <xsd:element ref="Client"/>
            <xsd:element ref="Language"/>
            <xsd:element ref="Codepage"/>
            <xsd:element ref="RecordedBy" minOccurs="0"/>
            <xsd:choice>
                <xsd:element ref="ApplicationServer"/>
                <xsd:sequence>
                    <xsd:element ref="MessageServer"/>
                    <xsd:element ref="Group"/>
                </xsd:sequence>
            </xsd:choice>
            <xsd:element name="ScriptingEngine"
type="ScriptingEngineType"/>
        </xsd:sequence>
    </xsd:complexType>
    <xsd:element name="GuiScripting">
        <xsd:complexType>
            <xsd:sequence>
                <xsd:element ref="ResetGUI" minOccurs="0"
maxOccurs="1"/>
                <xsd:element ref="ConnectionId"/>
                <xsd:element ref="SessionId"/>
                <xsd:element name="SystemInfo"
type="SystemInfoType"/>
                <xsd:element name="ProcessedScreen"
type="ProcessedScreenType" maxOccurs="unbounded"/>
            </xsd:sequence>
        </xsd:complexType>
    </xsd:element>
</xsd:schema>
```

Figure 4:
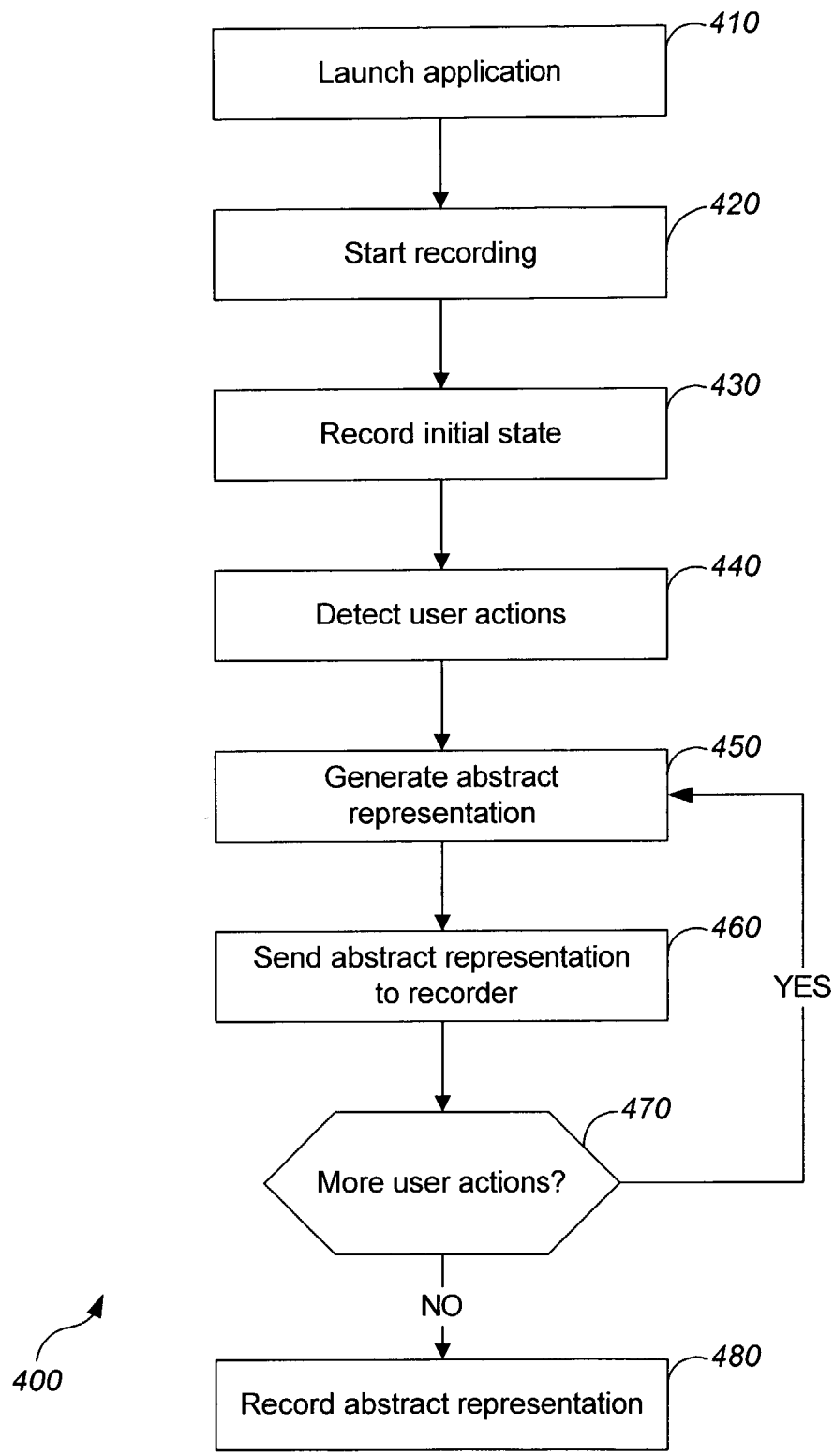
FIG. 4 is a flow diagram illustrating a method for generating a non-client specific user interface script.

FIG. 4 illustrates a method 400 for generating an abstract representation of user actions performed in interacting with an application program in a user interface environment. The method begins with the launching of an application program to be tested, for example, by a test manager (step 410). The application program is configured to interact with a user through a user interface running in a user interface environment. Subsequently, the method receives input requesting a recording session to generate an abstract representation of one or more subsequent actions performed in the user interface (step 420). The initial state for each user interface element in the user interface of the application program is recorded (step 430). The method then receives input defining one or more user actions in the user interface, which are detected by a scripting engine (step 440). The scripting engine can detect the user actions by receiving messages and/or procedure calls generated by the user interface components upon which the user has acted for transmission to the application program, as described above. The scripting engine generates an abstract representation of the user actions (step 450). The abstract representation includes information sufficient to describe and recreate each call to a property or method of any element of the user interface in an intermediate format. The abstract representation can include information representing each user action in the user interface; alternatively, the abstract representation can reflect only changes in the state of user interface elements at predetermined intervals or in response to predetermined events. In one implementation, the scripting engine can assign responsibility for detecting a user's interaction with individual components of the user interface environment to one or more scripting processes. These scripting processes can also be responsible for extracting high level information about changes in the state of their assigned components for use in generating the abstract representation. The scripting engine (or its constituent scripting processes) transmits the abstract representation to a recorder process (step 460). As additional user actions are detected (the "yes" branch of step 470), the scripting engine repeats steps 450 and 460, transmitting additional high level information to the recorder for inclusion in the abstract representation. When the method receives input closing the application program or terminating the recording session, the recorder process then stores the abstract representation in a data store (step 480)—for example, a data store associated with a test server hosting a test control program 110. Alternatively, the abstract representation can be stored incrementally as the recording session continues. Optionally, after receiving input closing the application or terminating the recording session, the scripting engine can make a final check to identify and record any remaining user actions.

Figure 5:
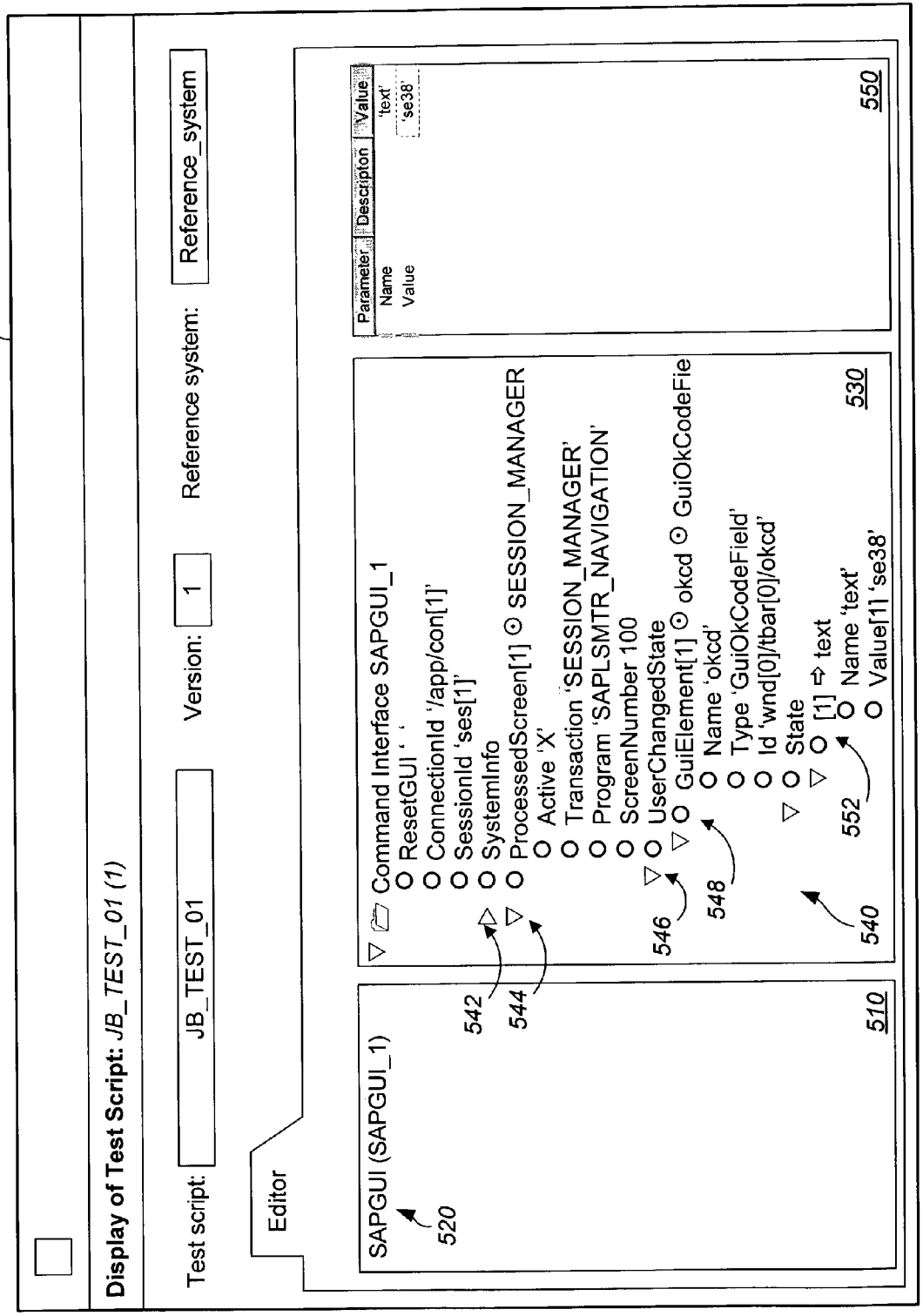
FIG. 5 illustrates one implementation of a user interface of a test system for generating and using non-client specific user interface scripts.

The recorded abstract representation can be used by a test control program 110 to replay the user actions in the same or a different user interface environment. In one implementation, the abstract representation is stored as a command interface for use by a test script object of the test control program as illustrated in FIG. 5. A command interface is a data structure that is used to store the names, types, and values of parameters (i.e., the information stored in the abstract representation) that are to be passed to an entity being tested (which can be a function module, an object method, a transaction field, or a screen or other GUI element). A command interface can also be used to assign specific initial or default values to parameters. In essence, command interfaces allow the description of the interfaces of the entities that are being tested, as well as the content with which the entities are to be invoked, to be separated from test scripts. Command interfaces thus offer a condensed and logical views of test scripts, and allow values or groups of values to be re-used in multiple invocations and even in multiple test scripts.

A user, e.g., a test manager, can request the test control program 110 to initiate a test by identifying a script object 155 and the computer or computers on which the application program and user interface to be tested is installed. The installation information can be provided to the script object 155 as a call parameter or, more conveniently, in system data 150 (FIG. 1), where it can be used by other script objects. Similarly, the test control program can obtain, e.g., from application meta-data, version information about the applications and/or user interfaces to be tested and provide it to the script object 155, e.g., by storing the information in system data 150 (FIG. 1); or the script object 155 can obtain this information itself. Having the application version information, the script object uses its test version data to select the appropriate test script to be executed.

In general, a test script will be executed multiple times by a test control program 110. The test script is parameterized for imported and exported data through the parameter interface of the script object, and each time the test script is executed, a different set of parameter variants, either recorded based on user actions as described above or entered directly by the user through the command interface, will be provided from a collection of test records. To manage the large volume of input data due to the multiple user interface calls, the command interface associated with each user interface session can be used repetitively to access different input data. By programming access to input test data using a command interface data structure, one can express the test scripts in a compact form with little repetition of test data and input parameters. (Command interfaces are described in commonly-owned, copending U.S. patent application Ser. No. 10/186,387, filed Jun. 28, 2002, the disclosure of which is incorporated here by reference.)

FIG. 5 illustrates one example of a graphical user interface (GUI) 500 of a test script editor program. The display shows that a user has selected to edit a test script object called JB_TEST_01, and in particular, test script version 1 of that test script object. A reference system has also been selected, for the editor to use as a source of meta-data describing the parameters and functions referred to in the test script and script object.

The current test script is shown in pane 510. Typically, a test script will include commands to perform an application function or to perform actions on an application user interface or both, conditional commands, and calls reading application data to determine if functions operated properly. Here, the test script includes a single driver command "SAPGUI ( )" 520, with a single command argument, the command interface "SAPGUI_1".

The GUI 500 also has a pane 530 in which it displays elements of the command interface "SAPGUI_1" 540, which in this example corresponds to the XML abstract representation set out in Listing 1. These elements include system data 542 and processed screen data 544, which in turn includes information describing the session, program and screen in which one nor more actions are to be performed. The processed screen data also includes changed state information that identifies the user interface elements upon which the actions will be performed, the properties and/or methods of these elements that will be changed or called to implement those actions, and the parameters with which those properties or methods will be set or called. Icons can be used to indicate the status of a given parameter—for example, whether or not a value has been assigned to the parameter, and if so, whether or not the value is fixed. This portion of the SAPGUI_1 command interface displays changed state information for a single user interface element, GuiElement 548, which corresponds to a type "GuiOKCodeField" element having the name "okcd" and the ID "wnd[0]/tbar[0]/okcd". As shown, when test control program 110 executes the SAPGUI_1 command interface in response to the SAPGUI command, it will set the okcd element's "text" property to a string value of "se38". If the command interface includes additional processed screen and changed state data, that data can be accessed by, e.g., scrolling down in command interface pane 530.

Pane 550 is a parameter interface display area, in which the user can view and modify information about parameters of a selected element of the command interface selected in command interface pane 530 (here, the "text" property 552 of GuiElement 548). As shown, Parameter Interface pane 550 displays the name and value of each parameter of the selected element, with a field for optional description information describing the parameter in more detail. In other implementations, the information that is displayed and modifiable in parameter interface display can include additional information related to the parameters, such as a parameter type, which can include any defined data type, e.g., string, a variable, a constant, a Boolean, or other simple type, or a composite or structured type. Optionally, the degree of detail provided in parameter interface pane 550 can be configurable by the user.

Figure 6:
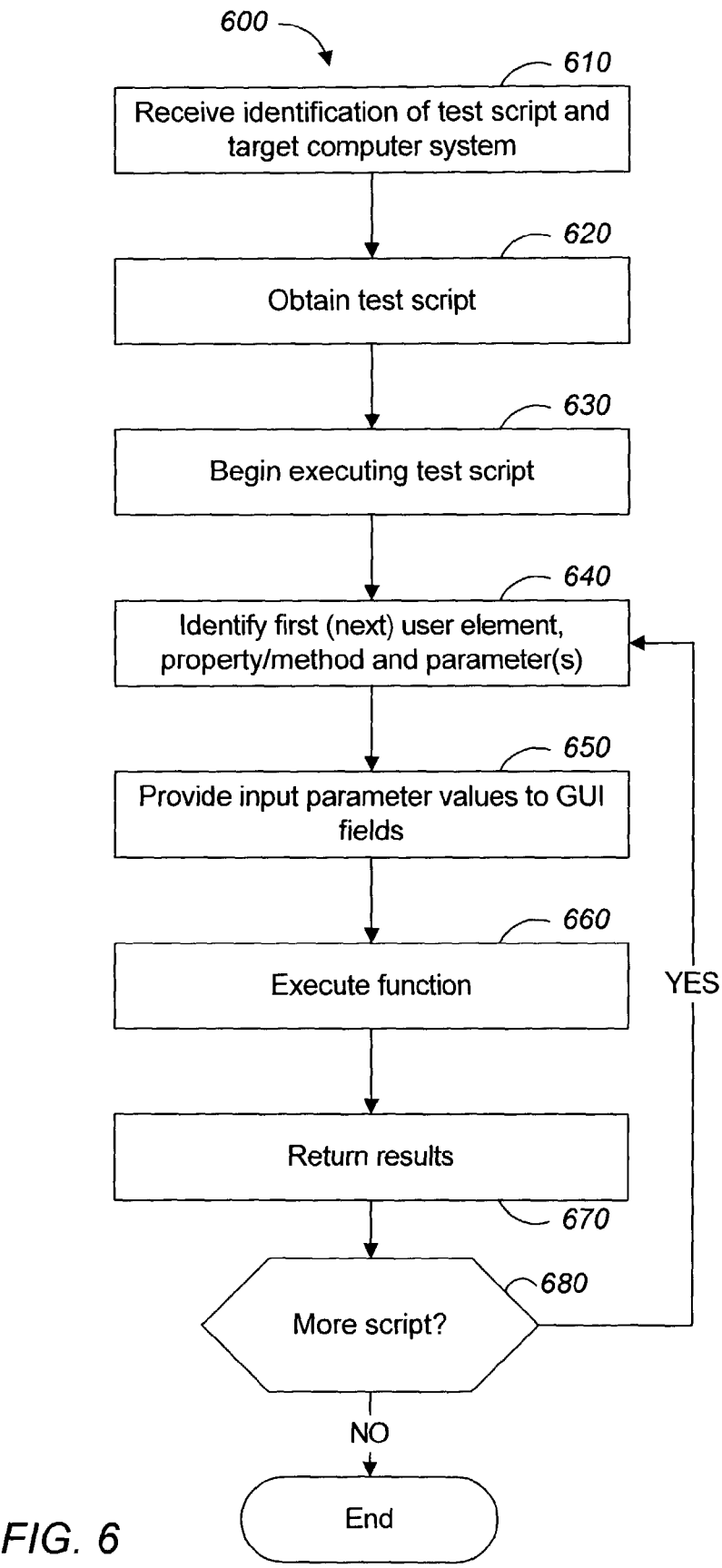
FIG. 6 is a flow diagram illustrating a method for using a non-client specific user interface script to test an application and user interface in a user interface environment.

FIG. 6 illustrates a process 600 for using a test script to test application functionality in different user interface environments. The process begins by receiving, for example, from a test manager, an identification of a test script and an identification of a target system, that is, of a computer system and user interface environment to be tested (step 610). The process obtains the specified test script (step 620), which includes one or more commands calling a command interface or interfaces specifying actions to be performed to test the operation of the application and user interface in a user interface environment. The test script can also include commands directly invoking application functions (e.g., through corresponding command interfaces).

The process then executes the test script (step 630). When it encounters a command that calls a command interface specifying actions to be performed in the user interface, the process identifies the first user interface element to be changed, the property that will be changed or method that will be called, and the input parameters that will be used (step 640). The input parameter values specified in the command interface for the changed elements of the screen are provided to their associated input fields (step 650) and the function (i.e., a set property function or method call) is executed (step 660). In one implementation, each user interface function specified in the command interface is executed by using the abstract representation to generate a lower-level user interface script that is compatible with the user interface environment in which the application program and user interface are being tested (e.g., in a language proprietary to the user interface environment, such as VBScript or JavaScript). Alternatively, the user interface function specified in the command interface can be executed by calling the specified property or method through a generic interface of the appropriate component of the user interface environment and passing the parameters set out in the command interface. The results of executing the function are returned (step 670), for example to a test control program, and processing of the test script continues. Any direct calls to application functions that are specified in the test script are processed in a similar fashion, using parameter values specified, e.g., in the test script object and parameter interface as illustrated in FIG. 1. The method terminates when each command of the test script has been executed (the "no" branch of step 680). At the conclusion of the test session, the results returned from the execution of each function can be examined and compared to a set of expected results to determine whether the application program and user interface performed as expected in the user interface environment. Alternatively, the returned results can be monitored as the test proceeds.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a data processing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Apparatus of the invention can be implemented as a programmed computer or as special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

The invention can be implemented in a computing system that includes a back-end component, e.g., as a data server, or includes a middleware component, e.g., an application server, or includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

Test scripts and script objects can be created in a variety of computer languages. Representing test scripts and script objects in a platform independent language, e.g., Extensible Markup Language (XML), allows one to provide test scripts that can be used on different types of computer platforms.

The invention has been described in terms of particular embodiments. Other embodiments are within the scope of the following claims. For example, the steps of the invention can be performed in a different order and still achieve desirable results. Multiple test script versions can edited and invoked as a unit without using object-oriented programming technology; for example, the elements of a script object can be organized in a structured database or a file system, and the operations described as being performed by the script object can be performed by a test control program, for example.

What is claimed is:

1. A computer-implemented method, comprising:
    detecting user actions performed in interacting with an application program executing on a server, the actions performed through a first user interface session, the first user interface session operating in a first user interface environment, the user actions accessing one or more components of the first user interface environment, the one or more components implementing user interface elements of the application program;

recording an abstract representation of the user actions describing the user actions in a format independent of the components of the first user interface environment, the abstract representation adapted for use with an executable multi-platform test script;

executing, by a client computer, the multi-platform test script to use the abstract representation of the user actions to interact with the application program through a second user interface session, the second user interface session operating in a second user interface environment, the second user interface environment not sharing a common programming interface with the first user interface environment, to recreate results of the user actions in the application program; and executing, by the client computer, the multi-platform test script to use the abstract representation of the user actions to interact with the application program through a third user interface session, the third user interface session operating in a third user interface environment, the third user interface environment not sharing the common programming interface with the second user interface environment, to recreate the results of the user actions in the application program.

2. The method of claim 1, wherein:
using the abstract representation includes generating one or more commands that, when executed in the second user interface environment, cause the application program to recreate results of the user actions.

3. The method of claim 2, wherein:
using the abstract representation includes using the commands to access one or more components of the second user interface environment.

4. The method of claim 3, wherein:
the abstract representation includes information representing the one or more user interface elements and one or more calls to methods of the user interface elements, the method calls corresponding to the user actions;
the method further comprising modifying the abstract representation in response to user input specifying one or more modified parameter values for one or more of the method calls corresponding to the user actions; and
wherein using the abstract representation includes calling one or more methods of user interface elements of the application program with the modified parameter values.

5. The method of claim 1, wherein:
detecting user actions includes receiving user input specifying one or more changes to elements of a user interface of the application program; and
recording the abstract representation includes identifying, in response to the user input specifying changes, one or more user interface elements having a changed state and recording, for each of the identified user interface elements, information representing the changed state.

6. The method of claim 5, wherein:
receiving the user input specifying one or more changes triggers a transmission from a client hosting the first user interface session operating in the first user interface environment to the application program executing on the server; and
the abstract representation is recorded before the transmission from the client to the server.

7. The method of claim 1, wherein:
detecting user actions includes receiving a stream of user input actions specifying changes to elements of a user interface of the application program; and
recording the abstract representation includes recording information representing each action in the stream of user input actions.

8. The method of claim 1, further comprising:
using the abstract representation to generate one or more commands that, when executed in the first user interface environment, cause the application program to recreate results of the user actions; and
executing the commands in the first user interface environment to recreate results of the user actions in the application program.

9. The method of claim 1, wherein:
the abstract representation is recorded in a format that is not proprietary to the first or second user interface environments.

10. The method of claim 9, wherein:
the format is an XML format.

11. The method of claim 10, wherein:
the XML format is defined by a schema including information describing a plurality of environments for the application program, a set of user interface elements provided by the application program in each of the plurality of environments, and, for each user interface element in the set of user interface elements, a set of one or more properties and/or methods that can be called in response to user actions performed on the corresponding user interface element.

12. The method of claim 9, wherein:
using the abstract representation includes generating, in a format proprietary to the second user interface environment, one or more commands that, when executed in the second user interface environment, cause the application program to recreate results of the user actions.

13. The method of claim 1, wherein:
the first and second user interface environments are selected from user interface environments that provide distinct component frameworks into which user interface components operate.

14. The method of claim 1, further comprising:
storing the abstract representation.

15. A computer-implemented method, comprising:
receiving an abstract representation of user actions performed in interacting with an application program executing on a server, the abstract representation adapted for use with an executable multi-platform test-script, the actions performed through a first user interface session, the first user interface session operating in a first user interface environment, the user actions accessing one or more components of the first user interface environment, the one or more components implementing user interface elements of the application program, the abstract representation describing the user actions in a format independent of the components of the first user interface environment;

executing, by a client computer, the multi-platform test script to use the abstract representation of the user actions to interact with the application program through a second user interface session, the second user interface session operating in a second user interface environment, the second user interface environment not sharing a common programming interface with the first user interface environment, to recreate results of the user actions in the application program; and executing, by the client computer, the multi-platform test script to use the abstract representation of the user actions to interact with the application program through a third user interface session, the third user interface session operating in a third user interface environment, the third user interface environment not sharing the common programming interface with the second user interface environment, to recreate results of the user actions in the application program.

16. The method of claim 15, wherein:
the user actions performed in interacting with the application program define one or more calls to methods of the one or more user interface elements of the application program; and
the abstract representation includes information representing the one or more user interface elements and the one or more method calls.

17. The method of claim 15, wherein:
using the abstract representation includes generating one or more commands that, when executed in the second user interface environment, cause the application program to recreate results of the user actions.

18. The method of claim 17, wherein:
the user actions performed in interacting with the application program in the first user interface environment define one or more calls to methods of user interface elements of the first instance of the application program; and
the commands define one or more calls to methods of user interface elements of the application program in the second user interface environment.

19. The method of claim 18, further comprising:
modifying the abstract representation in response to user input specifying one or more modified parameter values for one or more of the method calls defined by the user actions; and
wherein using the abstract representation in the second user interface environment includes calling one or more methods of user interface elements of the application program with the modified parameter values.

20. The method of claim 15, wherein:
the abstract representation is recorded in a format that is not proprietary to the first or second user interface environments.

21. The method of claim 20, wherein:
the format is an XML format defined by a schema including information describing a plurality of environments for the application program, a set of user interface elements provided by the application program in each of the plurality of environments, and, for each user interface element in the set of user interface elements, a set of one or more properties and/or methods that can be called in response to user actions performed on the corresponding user interface element.

22. A data file stored on a computer-readable medium for describing user actions in an application program, the data file comprising:
an abstract representation of user actions performed in interacting with an application program executing on a server, the actions performed through a first user interface session, the first user interface session operating in a first user interface environment, the user actions accessing one or more components of the first user interface environment, the one or more components implementing user interface elements of the application program, the abstract representation describing the user actions in a format independent of the components of the first user interface environment; and
a multi-platform test script that is executed to implement the abstract representation to interact with the application program through a second user interface session, the second user interface session operating in a second user interface environment, the second user interface environment not sharing a common programming interface with the first user interface environment, to recreate results of the user actions in the application program, wherein the multi-platform test script is executed to implement the abstract representation to interact with the application program through a third user interface session, the third user interface session operating in a third user interface environment, the third user interface environment not sharing a common programming interface with the second user interface environment, to recreate the results of the user actions in the application program.

23. The data file of claim 22, wherein:
the user actions define one or more calls to methods of one or more user interface elements in the first instance of the application program; and
the abstract representation includes information representing the one or more user interface elements and the one or more method calls.

24. The data file of claim 22, wherein:
the abstract representation includes information representing a state of each of one or more user interface elements of the application program.

25. The data file of claim 22, wherein:
the abstract representation includes information representing actions in a stream of user input actions specifying changes to elements of a user interface of the application program.

26. The data file of claim 22, wherein:
the abstract representation is recorded in a format that is not proprietary to the first or second user interface environments.

27. The data file of claim 26, wherein:
the format is an XML format.

28. The data file of claim 27, wherein:
the XML format is defined by a schema including information describing a plurality of environments for the application program, a set of user interface elements provided by the application program in each of the plurality of environments, and, for each user interface element in the set of user interface elements, a set of one or more properties and/or methods that can be called in response to user actions performed on the corresponding user interface element.

29. A system for recording a sequence of user actions, comprising:
an application program executing in a first user interface environment, the first user interface environment including one or more components implementing user interface elements of the application program;
a scripting engine operable to automatically detect a user action performed in interacting with the application program executing on a server, the action performed through a first user interface session, the first user interface session operating in the first user interface environment, the scripting engine being operable to generate an abstract representation of the user action, the abstract representation describing the user actions in a format independent of the components of the first user interface environment, the abstract representation adapted for use with a multi-platform test script, the multi-platform test script being executed to interact with the application program through a second user interface session, the second user interface session operating in a second user interface environment, the second user interface environment not sharing a common programming interface with the first user interface environment, to recreate results of the user actions in the application program, and wherein the multi-platform test script is executed to interact with the application program through a third user interface session, the third user interface session operating in a third user interface environment, the third user interface environment not sharing the common programming interface with the second user interface environment, to recreate the results of the user actions in the application program; and a recorder configured to record the abstract representation automatically.

30. A computer program product, tangibly embodied on a computer-readable medium, for storing instructions for representing user interactions with an application program, the computer program product being operable to cause data processing apparatus to:

detect user actions performed in interacting with an application program executing on a server, the actions performed through a first user interface session, the first user interface session operating in a first user interface environment, the user actions accessing one or more components of the first user interface environment, the one or more components implementing user interface elements of the application program;

record an abstract representation of the user actions describing the user actions in a format independent of the components of the first user interface environment, the abstract representation being usable as a multi-platform test script;

execute the multi-platform test script to use the abstract representation of the user actions to interact with the application program through a second user interface session, the second user interface session operating in a second user interface environment, the second user interface environment not sharing a common programming interface with the first user interface environment, to recreate results of the user actions in the application program; and execute the multi-platform test script to use the abstract representation of the user actions to interact with the application program through a third user interface session, the third user interface session operating in a third user interface environment, the third user interface environment not sharing a common programming interface with the second user interface environment, to recreate the results of the user actions in the application program.

31. The computer program product of claim 30, wherein: the instructions to use the abstract representation include instructions to generate one or more commands that, when executed in the second user interface environment, cause the application program to recreate results of the user actions.

32. The computer program product of claim 31, wherein: the instructions to use the abstract representation include instructions to use the commands to access one or more components of the second user interface environment.

33. The computer program product of claim 32, wherein: the abstract representation includes information representing the one or more user interface elements and one or more calls to methods of the user interface elements, the method calls corresponding to the user actions;

the computer program product further comprising instructions to modify the abstract representation in response to user input specifying one or more modified parameter values for one or more of the method calls corresponding to the user actions; and wherein the instructions to use the abstract representation include instructions to call one or more methods of user interface elements of the application program with the modified parameter values.

34. The computer program product claim 30, wherein: the instructions to detect user actions include instructions to receive user input specifying one or more changes to elements of a user interface of the application program; and the instructions to record the abstract representation include instructions to identify, in response to the user input specifying changes, one or more user interface elements having a changed state and recording, for each of the identified user interface elements, information representing the changed state.

35. The computer program product of claim 34, further comprising instructions to:

trigger a transmission from a client hosting the first user interface session operating in the first user interface environment to the application program executing on the server in response to user input specifying one or more changes; and wherein the abstract representation is recorded before the transmission from the client to the server.

36. The computer program product of claim 30, wherein: the instructions to detect user actions include instructions to receive a stream of user input actions specifying changes to elements of a user interface of the application program; and the instructions to record the abstract representation include instructions to record information representing each action in the stream of user input actions.

37. The computer program product of claim 30, further comprising instructions to:

use the abstract representation to generate one or more commands that, when executed in the first user interface environment, cause the application program to recreate results of the user actions; and execute the commands in the first user interface environment to recreate results of the user actions in the application program.

38. The computer program product of claim 30, wherein: the abstract representation is recorded in a format that is not proprietary to the first or second user interface environments.

39. The computer program product of claim 38, wherein: the format is an XML format.

40. The computer program product of claim 39, wherein: the XML format is defined by a schema including information describing a plurality of environments for the application program, a set of user interface elements provided by the application program in each of the plurality of environments, and, for each user interface element in the set of user interface elements, a set of one or more properties and/or methods that can be called in response to user actions performed on the corresponding user interface element.

41. The computer program product of claim 38, wherein: the instructions to use the abstract representation include instructions to generate, in a format proprietary to the second user interface environment, one or more commands that, when executed in the second user interface environment, cause the application program to recreate results of the user actions.

42. The computer program product of claim 30, wherein:
the first and second user interface environments are selected from user interface environments that provide distinct component frameworks into which user interface components operate.

43. The computer program product of claim 30, further comprising:
instructions to store the abstract representation.

44. A computer program product, tangibly embodied on a computer-readable medium, for recreating user interactions with an application program, the computer program product being operable to cause data processing apparatus to:
receive an abstract representation of user actions performed in interacting with an application program executing on a server, the actions performed through a first user interface session, the first user interface session operating in a first user interface environment, the user actions accessing one or more components of the first user interface environment, the one or more components implementing user interface elements of the application program, the abstract representation describing the user actions in a format independent of the components of the first user interface environment;
execute the multi-platform test script to use the abstract representation of the user actions to interact with the application program through a second user interface session, the second user interface session operating in a second user interface environment, the second user interface environment not sharing a common programming interface with the first user interface environment, to recreate results of the user actions in the application program; and
execute the multi-platform test script to use the abstract representation of the user actions to interact with the application program through a third user interface session, the third user interface session operating in a third user interface environment, the third user interface environment not sharing a common programming interface with the second user interface environment, to recreate the results of the user actions in the application program.

45. The computer program product of claim 44, wherein:
the user actions performed in interacting with the application program define one or more calls to methods of the one or more user interface elements of the application program; and
the abstract representation includes information representing the one or more user interface elements and the one or more method calls.

46. The computer program product of claim 44, wherein:
the instructions to use the abstract representation include instructions to generate one or more commands that, when executed in the second user interface environment, cause the application program to recreate results of the user actions.

47. The computer program product of claim 46, wherein:
the user actions performed in interacting with the application program in the first user interface environment define one or more calls to methods of user interface elements of the first instance of the application program; and
the commands define one or more calls to methods of user interface elements of the application program in the second user interface environment.

48. The computer program product of claim 47, further comprising:
instructions to modify the abstract representation in response to user input specifying one or more modified parameter values for one or more of the method calls defined by the user actions; and
wherein the instructions to use the abstract representation in the second user interface environment include instructions to call one or more methods of user interface elements of the application program with the modified parameter values.

49. The computer program product of claim 44, wherein:
the abstract representation is recorded in a format that is not proprietary to the first or second user interface environments.

50. The computer program product of claim 49, wherein:
the format is an XML format defined by a schema including information describing a plurality of environments for the application program, a set of user interface elements provided by the application program in each of the plurality of environments, and, for each user interface element in the set of user interface elements, a set of one or more properties and/or methods that can be called in response to user actions performed on the corresponding user interface element.

51. The computer-implemented method of claim 1, wherein executing the multi-platform test script comprises:
identifying a first user interface element, a first function related to the first user interface element, and a first input parameter related to the first user interface element;
providing the first input parameter to the first user interface element;
executing the first function; and
returning a first result that results from executing the first function.

52. The computer-implemented method of claim 51, wherein executing the multi-platform test script further comprises:
identifying a second user interface element, a second function related to the second user interface element, and a second input parameter related to the second user interface element;
providing the second input parameter to the second user interface element;
executing the second function; and
returning a second result that results from executing the second function.

* * * * *